United States Patent
Goranson

[11] Patent Number: 6,157,014
[45] Date of Patent: Dec. 5, 2000

[54] PRODUCT-BASED MICROWAVE POWER LEVEL CONTROLLER

[75] Inventor: James A. Goranson, Williamsburg, Iowa

[73] Assignee: Amana Company, L.P., Amana, Iowa

[21] Appl. No.: 09/342,496

[22] Filed: Jun. 29, 1999

[51] Int. Cl.[7] .............................. H05B 6/78; H05B 6/68
[52] U.S. Cl. ........................ 219/700; 219/388; 219/518; 219/704; 219/762; 99/451; 99/443 C
[58] Field of Search ..................................... 219/700, 701, 219/702, 704, 705, 762, 392, 388, 518; 99/DIG. 14, 451, 443 R, 443 C

[56] References Cited

U.S. PATENT DOCUMENTS

| | | |
|---|---|---|
| Re. 29,837 | 11/1978 | Moore . |
| 3,541,289 | 11/1970 | Smith . |
| 3,665,491 | 5/1972 | Cooper . |
| 3,854,022 | 12/1974 | Moore . |
| 3,967,088 | 6/1976 | Horiuchi . |
| 3,974,353 | 8/1976 | Goltsos . |
| 4,115,679 | 9/1978 | Moore . |
| 4,396,817 | 8/1983 | Eck et al. . |
| 4,441,003 | 4/1984 | Eves, II et al. . |
| 4,517,429 | 5/1985 | Horinouchi . |
| 4,833,304 | 5/1989 | Ueda . |
| 4,839,485 | 6/1989 | Koch et al. . |
| 4,904,835 | 2/1990 | Koch et al. . |
| 4,914,277 | 4/1990 | Guerin et al. . |
| 4,956,530 | 9/1990 | Koch . |
| 4,956,532 | 9/1990 | Koch . |
| 5,011,042 | 4/1991 | Bunce et al. . |
| 5,025,132 | 6/1991 | Fortmann et al. . |
| 5,036,179 | 7/1991 | Westerberg et al. . |
| 5,039,535 | 8/1991 | Lang et al. . |
| 5,134,263 | 7/1992 | Smith et al. . |
| 5,160,819 | 11/1992 | Ball et al. . |
| 5,253,564 | 10/1993 | Rosenbrock et al. . |
| 5,352,874 | 10/1994 | Gong . |
| 5,541,390 | 7/1996 | Pinceloup . |
| 5,620,624 | 4/1997 | Westerberg . |
| 5,829,163 | 11/1998 | Park et al. . |
| 5,877,477 | 3/1999 | Petty et al. . |
| 5,897,807 | 4/1999 | Edgar et al. . |

FOREIGN PATENT DOCUMENTS

| | | |
|---|---|---|
| 0 066 637 A1 | 12/1982 | European Pat. Off. . |
| 3-282126 | 12/1991 | Japan . |

*Primary Examiner*—Philip H. Leung
*Attorney, Agent, or Firm*—Bracewell & Patterson, L.L.P.

[57] ABSTRACT

A microwave apparatus and system that monitors the amount of food products within a cavity and adjust the microwave power provided to the cavity. The apparatus and system uses a product sensor system and a movement sensor system to accurately determine the product load in the microwave cavity. A computer controller, based on the product load information provided by the product sensor system and the movement sensor system, operates to adjust the amount of power provide to the microwave cavities by the microwave transmitters.

14 Claims, 3 Drawing Sheets

PRODUCT-BASED MICROWAVE POWER LEVEL CONTROLLER

BACKGROUND OF THE INVENTION

1. Field of the Invention

Broadly, this invention relates to a cooking system that monitors and measures the amount of product to be cooked (the product load) and adjusts the power level of the cooking apparatus (oven) based on the product load. More particularly, this invention relates to a conveyor-type oven having a device that monitors the amount of product to be cooked in the oven and automatically controls/adjusts the power level of the oven generator to correspond to the load.

2. Description of Related Art

Typically, food products (strips of bacon or other similar products) enter an oven system on a conveyor belt and are transmitted through a cavity containing the energy or heat to cook the products. Most of these oven systems use microwave energy to cook the products. In existing industrial conveyor-type microwave ovens, the power level generated by the microwave transmitters is set by the operator to match the maximum load capacity of the cavity or the maximum load expected in the cavity. Problems arise when the load drops, i.e., fewer strips of bacon are put on the conveyor belt. If not enough product is placed on the conveyor belt going through the system, there is a power mis-match between the power needed to cook the product load and the actual power provided. As a result of this power mis-match, the product is often overcooked. In some instances, the excess microwave energy present in the cavity could result in arcing. Severe arcing damages the equipment and possibly could cause the product to catch on fire. Previous attempts to solve this problem have concentrated on keeping the conveyor belt loaded to capacity or maintaining a consistent product load, thereby avoiding load variations and power mis-matches.

SUMMARY OF INVENTION

Based on the problems as described above, an object of the invention is to provide an apparatus that will adequately and accurately monitor and measure the product load entering the microwave cavity. An additional object of the invention is to provide an apparatus that adequately prevents power mis-matches within the microwave cavity. Still further, an object of the invention is to adequately and accurately adjust the microwave power to correspond to the product load.

As such, in a specific embodiment, the invention is directed to a microwave apparatus having a series of sensors (a product sensor system) near the input of the microwave cavity and a computer controller. The sensors determine the amount of product on the conveyor about to enter the microwave cavity. The sensors transmit signals to the computer controller so that the controller can determine the product load entering the microwave cavity, calculate the appropriate microwave energy necessary to properly cook the load, and automatically adjust the power levels of the microwave transmitters to prevent product overcooking and reduce arcing. By having a series of sensors near the input of the cavity, the controller keeps track of the stream of products on the conveyor belt and continually adjusts the power of the microwave transmitters to match the changing load as it travels through the oven.

The system also includes additional sensors (a movement sensor system) near a sprocket, axle or gear of the conveyor or motor to ensure the conveyor belt is moving correctly. This movement sensor system is used to ensure that the product load is accurately determined. In other words, the product sensor system and the movement sensor system operate to accurately determine the amount and position of product load (the concentration of the load). This information is sent to the computer controller so that the microwave transmitters may be adjusted based on the amount of product entering and leaving the oven.

BRIEF DESCRIPTION OF DRAWINGS

Other objects and advantages of the present invention will become apparent from the following description taken in connection with the accompanying drawings which are set forth by way of illustration as examples of embodiments of the present invention, where.

Figure 1:
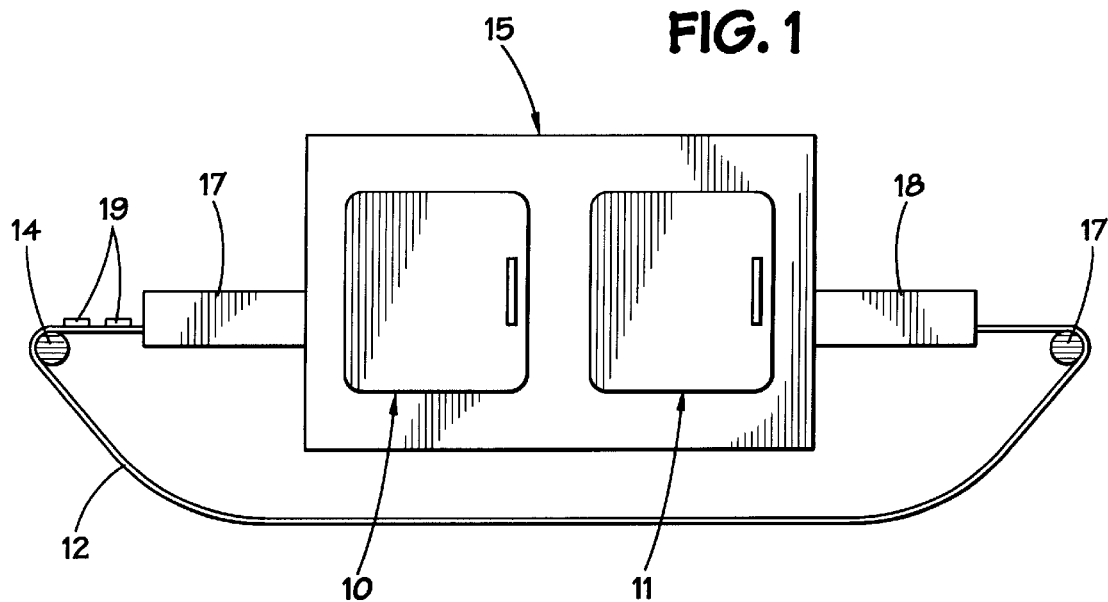
FIG. 1 is an elevation view of a conveyor type cooking system.

While the invention will be described in connection with preferred and alternative embodiments, it will be understood that the description is not intended to limit the invention to those embodiments. On the contrary, it is intended to cover all alternatives, modifications, and equivalents, as may be included within the spirit and scope of the invention as defined by the appended claims.

DETAILED DESCRIPTION OF SPECIFIC EMBODIMENTS

Specific embodiments of the invention will now be described as part of the detailed description. In the drawings, like elements have the same reference numbers for purposes of simplicity. It is understood that the invention is not limited to the specific examples and embodiments, including those shown in the drawings, which are intended only to assist a person skilled in the art in practicing the invention. Many modifications and improvements may be made without departing from the scope of the invention, which should be determined based on the claims below, including any equivalents thereof.

Within these above descriptions, a more detailed explanation of a specific embodiment follows. Referring to FIG. 1, a conveyor type microwave oven system is shown. An example of such an oven system is Amana's Industrial Microwave Cooking Oven, Product Number QMP2103. The invention described herein is particularly useful in high power (10–100 KW) industrial microwave systems for meat tempering and bacon cooking. However, it should be understood that the invention is not limited to meat tempering or bacon cooking. The invention may be equally applicable to other uses. Further, this description of the conveyor-type microwave oven is not intended to limit the type of oven that can be used with this invention. While the preferred embodiment is a conventional conveyor-type microwave oven, any conveyor-type oven could be used For example, the oven may be a radiant energy oven.

In the conveyor type microwave oven, as shown in FIG. 1, objects to be heated or cooked, food products 19, are positioned on a conveyor belt 12. The conveyor belt 12 is driven in a continuous loop by a conveyor motor which is operably connected to a conveyor belt drum or axle 14. The conveyor belt 12 is also disposed over a conveyor belt drum or axle 13. Upon activation of the conveyor motor, the conveyor belt 12 passes through a right opening and a left opening (not shown) in the microwave oven 15 and a right opening and a left opening (not shown) in suppression tunnels 17 and 18, respectively. The suppression tunnels 17 and 18 are attached to the microwave oven 15 to prevent microwave energy from escaping from the oven 15.

Still referring to FIG. 1, the oven 15 is substantially rectangular and formed by an outer microwave enclosure, preferably formed of sheets of metal such as stainless steel or aluminum. The oven is also formed by an inner microwave enclosure or cavity. The oven 15, depicted in FIG. 1, includes two microwave cavities 10 and 11. The microwave cavities consists of a cavity ceiling, a cavity bottom, a right cavity side, and a left cavity side. This description of the conveyor-type microwave oven is not intended to limit the type of microwave oven that can be used with this invention. Any conventional conveyor-type microwave oven may be used. For example, an industrial microwave oven, having one or more microwave cavities, may be used.

A generator, associated with each cavity, is set to provide a predetermined amount of energy/heat to cook the products in the cavity. In a microwave oven, the generator is a microwave transmitter. Typically, the predetermined energy level is set to match the maximum load capacity of the cavity. When the product load is less than maximum, a power mis-match occurs between the power needed to cook the less than maximum product load and the pre-set energy level. Accordingly in these systems, it was of great importance to maintain a constant maximum load going into the cavity. If the cavity became over-loaded, the product was undercooked. If the cavity became under-loaded, the product may be overcooked and the excess microwave energy present in the cavity caused arcing and fire in the cavity.

Figure 2:
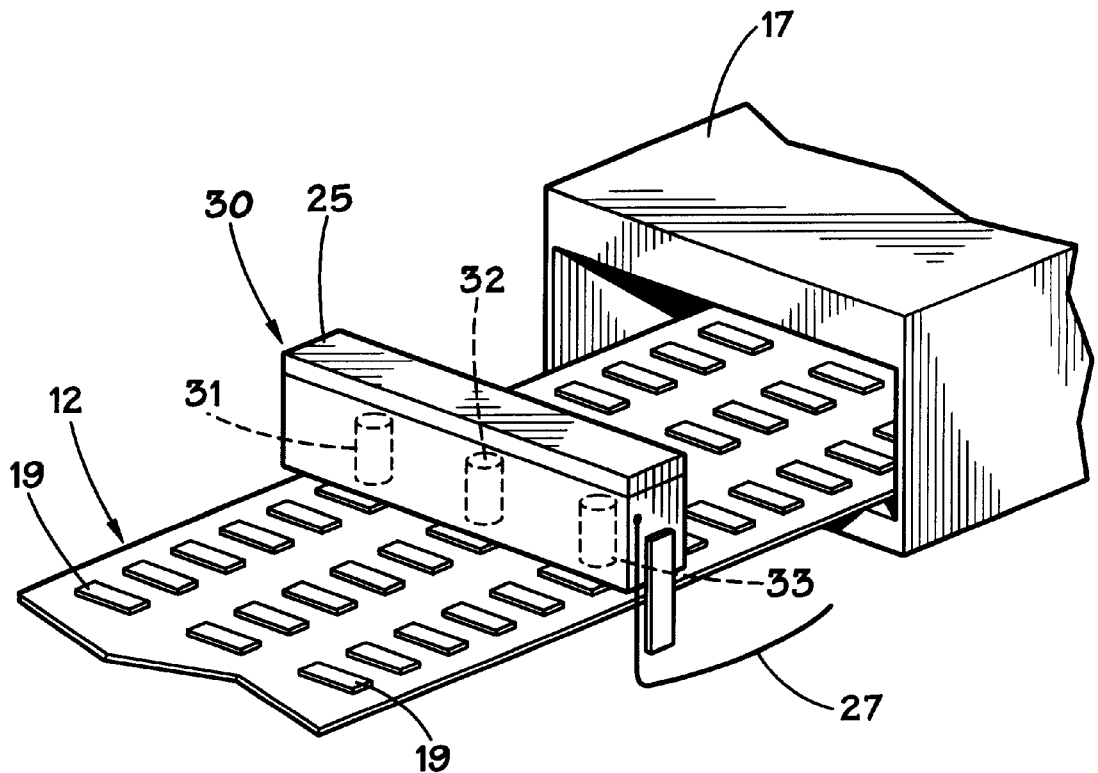
FIG. 2 is a partial perspective view of the product sensor system and oven according to one embodiment of the present invention.

As shown in FIG. 2, a product sensor system may be used to monitor the product load so that the energy level of the generator may be adjusted. In essence, this adjustment is based on the product load in the oven. In this manner, the generator power is at a level to appropriately cook (no under or over cooking) a varying load that enters the oven.

In accordance with the present invention and in a preferred embodiment. a product sensor system 30 is mounted over the conveyor belt 12 and positioned so to monitor the food products 19 before they enter the suppression tunnel 17 and microwave oven 15 (shown in FIG. 1). Preferably, product sensors 31, 32 and 33 are housed in a sensor mounting box 25 and coupled, through connector 27 to a computer controller. The computer controller will be described in more detail below in conjunction with FIG. 5.

The number of sensors may vary according to the food product 19 being cooked and the number of rows of food products 19 capable of being placed on the belt 12. In the preferred embodiment as shown in FIG. 2, the product sensor system 30 comprises product sensors 31, 32 and 33 because the oven system will be cooking three rows of bacon. Using product sensor system 30, the food products 19 (slices of bacon) do not have to be precisely or consistently loaded onto conveyor belt 12 as the sensors 31, 32 and 33 will detect the presence/absence of a slice of bacon passing into the cavity. The microwave power will be adjusted accordingly. For larger food products 19 and/or a smaller belt 12, a single product sensor may be sufficient. Likewise for smaller food products 19 and/or a larger belt 12, additional product sensors may be necessary. The number of product sensors must be sufficient to adequately monitor the amount of food product 19 entering the microwave cavity.

The product sensors may be any conventional sensor. Preferably, Efector color sensors (ifm Efector OD5007) are used. These sensors are calibrated to the food product 19, for example the white fat of the bacon product. When a bacon product 19 passes underneath the sensors 31, 32 or 33, the fat is detected, causing a signal to be sent to the computer controller. Alternatively, Efector infrared diffuse sensors, product number OG5050, could be used wherein the product sensors would be calibrated to the conveyor belt 12. These sensors work by emitting a pulse of infrared light and measuring the amount which is reflected back. When food products 19 pass underneath this sensor, a different amount of infrared is reflected back, causing a signal to be transmitted to the computer controller.

Figure 3:
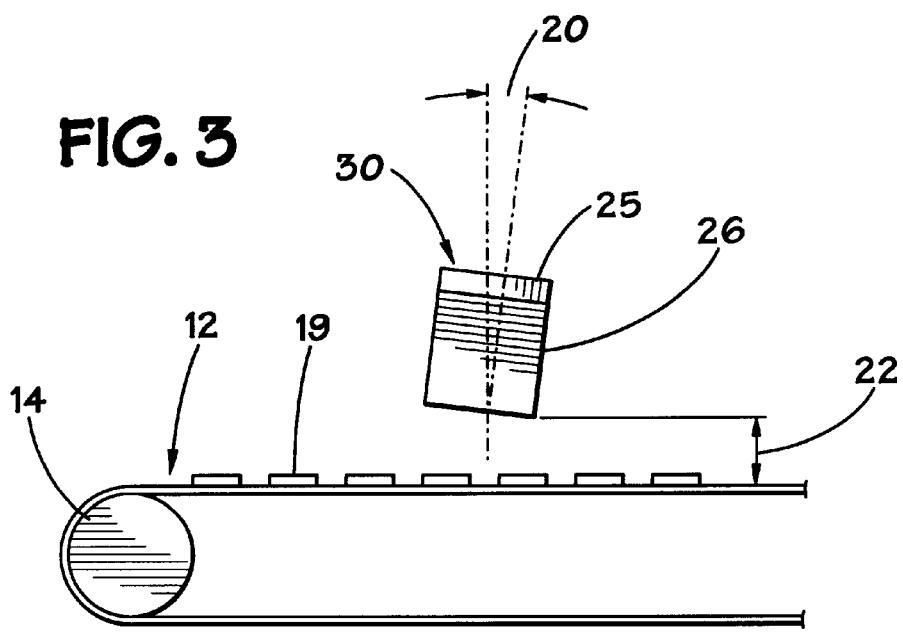
FIG. 3 is a partial elevation view of the product sensor system according to one embodiment of the present invention.

As shown in FIG. 3, the sensor system 30 is preferably titled or angled to improve its detection capabilities. In the preferred embodiment, sensor mounting box 25 is mounted to the conveyor system at an angle 20. Preferably, this angle 20 is 5° off perpendicular center. In this manner, the sensors 31, 32 and 33 (shown in FIG. 2) detect the food products 19 at a 95° angle. Additionally, the product sensor system 30 is preferably mounted at a height 22 above the conveyor belt 12 to further optimize the detection of the food products 19. Preferably height 22 is 1¾ inches above the belt 12. In a preferred embodiment, the sensor mounting box is mounted at angle 20 (5°) and the trailing edge 26 of the sensor mounting box 25 is positioned at a height 22 (1¾ inches) above the conveyor belt 12. While the angle 20 at 5° and the height 22 at 1¾ inches are preferred amounts, other comparable amounts will also work. For example, the product sensor system 30 may be angled off center within the range of 0° to 20° and still perform. Further, while the height 22 is somewhat dependent on the thickness of food product 19, the sensor system may be mounted within a height range of ½ inch to 4 inches from the belt 12 and still perform.

Figure 4:
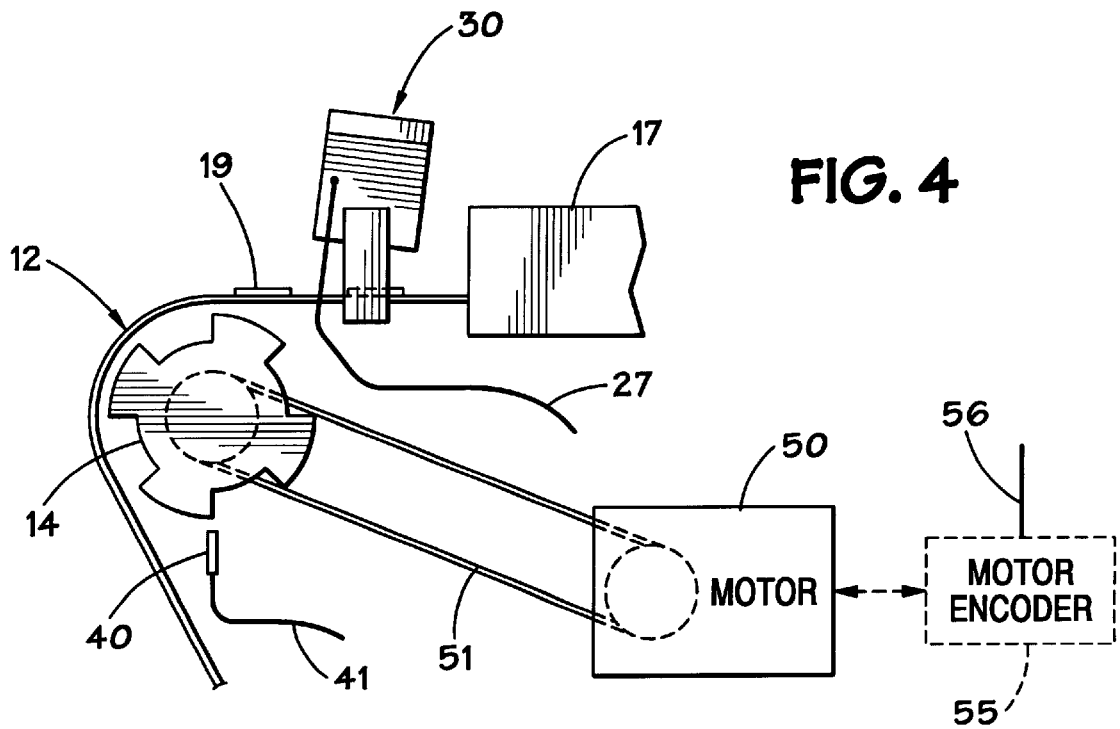
FIG. 4 is a partial elevation view of the product sensor system, the movement sensor system and the conveyor oven system according to one embodiment of the present invention.

FIG. 4 shows a motor 50, operably connected to axle 14. The motor 50 turns the axle 14 and causes the conveyor belt 12 to move. Motor 50 may be any convention motor such as a Baldor 2 horsepower AC motor (product no. VWOM3558) with a 100 to 1 gear reducer from Grant Gear (product no. D8F-350-100-A-D-M5). The motor 50 is operably connected to axle 14 through belt 51 such that as an internal shaft (not shown) of the motor 50 rotates, the axle 14 rotates moving the conveyor belt 12. It is understood that this is only one example of a motor-conveyor assembly and any other motor-conveyor belt assembly may be used. For example, a gear assembly may also be used.

FIG. 4 also shows the product sensor system 30, a proximity sensor 40 and a motor encoder 55. The proximity sensor 40 and/or motor encoder 55 are referred to generally as a movement sensor system 60 (depicted in FIG. 6). In other words, the movement sensor system 60 may comprise the proximity sensor 40, the motor encoder 55 or both the proximity sensor 40 and the motor encoder 55.

The proximity sensor 40 is mounted near the axle 14 and monitors the axle 14 to detect the belt's movement and to ensure that the conveyor is turning at the appropriate times or rates. The axle 14 and thus the belt 12 can be moving continuously, periodically or at a variable rate. The proximity sensor 40 keeps track of the advancement of the conveyor belt 12 and can detect if the belt 12 has broken or otherwise malfunctioned. In a periodic system, the proximity sensor 40 sends a signal to the computer controller 70 each time the axle 14 advances In a continuous or variable rate system, the proximity sensor 40 sends a signal to the computer controller 70 after the belt 12 has moved a particular distance. The sensor 40 is coupled to the computer controller 70 through connection 41. If the axle 14 stops moving or fails to advance at the appropriate time, the computer controller 70 recognizes that the proximity sensor 40 has not provided a signal and can shut down the system (microwave power).

The computer controller 70 (FIG. 6) indexes memory 80 (advances to the next memory location) when a it receives a signal from the proximity sensor 40. This allows the computer controller 70, through it associated memory 80, to keep track of products on the belt as they move through the system. Preferably, the sensor 40 signals the computer controller 70 each time the belt 12 has moved 5½ inches. This is called the duty cycle. In a periodic system, this would be each time that the axles moves. In a continuous or variable rate system, this would be at a time related to the rate of movement of the belt 12. The duty cycle (distance of belt movement between movement sensor signals) is based on the food products that are being cooked. For example, for longer food products, the distance may need to be longer and for shorter food products, the distance may need to be shorter. Essentially, the distance is selected so that the detection of each food product 19 as it moves under the product sensor system 30 will only be stored as the detection of a single food product. For example if the distance or duty cycle was 2¼ inches, then sensors 31, 32 and 33 may be detecting the same piece of bacon in the two different duty cycles, thus recording the presence of twice as many food products 19. This would give an inaccurate representation of the actual food products in the cavity. Accordingly, using the proximity sensor 40 and the set duty cycle, the computer controller 70 can keep track of each food product 19 detected by the sensor system 30 and can predict based on the proximity sensor and the duty cycle when the food product 19 will enter suppression tunnel 17 and eventually the oven.

Alternatively, the movement sensor system 60, as described above, may comprise an encoder sensor 55. In this embodiment, the rotation of conveyor belt 12 and the movement of food products 19 would be monitored by the encoder sensor 55. Any convention encoder sensor, providing a pulse signal representative of motor revolutions may be used. Like the proximity sensor 40, the encoder sensor 55 signals the computer controller 70. Through it connection 56, each time the conveyor belt travels 5½ inches. In another embodiment, the movement sensor system 60 may comprise both a proximity sensor 40 and an encoder sensor 55.

Figure 5:
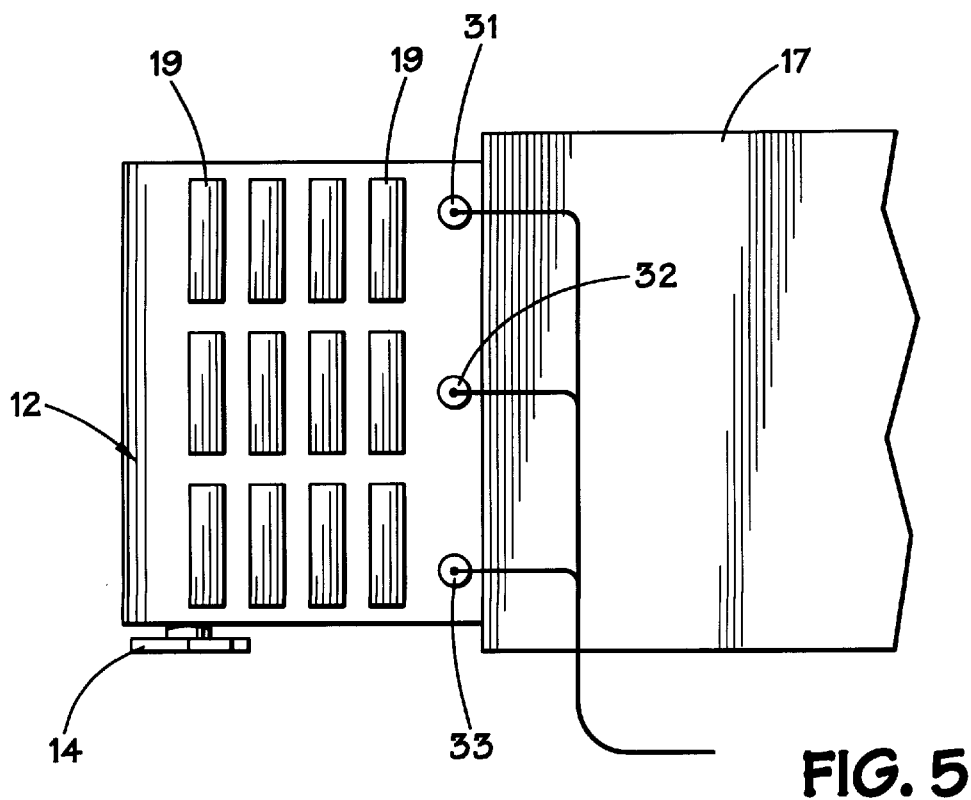
FIG. 5 is a partial plan view of the product sensor system and oven system according to another embodiment of the present invention.

FIG. 5 shows an alternative embodiment for mounting the sensor system 30. In FIG. 5, sensors 31, 32 and 33 are mounted directly to suppression tunnel 17. The sensors may still have an optimal angle or tilt and may still be mounted at an optimal height above the conveyor belt 12. Like the embodiments described with respect to FIGS. 2, 3 and 4, the food products 19, positioned on conveyor belt 12 pass under the sensors 31, 32 and 33 and are detected before entering the suppression tunnel 17. All other operation are likewise similar to the operation and arrangement as described above in FIGS. 2, 3 and 4.

Figure 6:
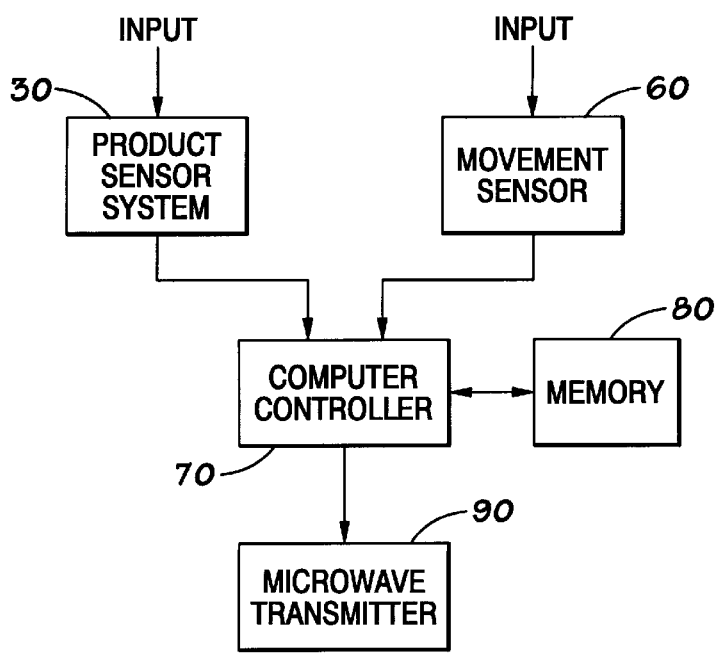
FIG. 6 is a block diagram of the product sensor system, movement sensor system, computer controller and oven system.

As shown in FIG. 6, the sensor system 30 (product sensor 31, 32 and 33), movement sensor 60 (proximity sensor 40 or encoder 55, or both) and computer controller 70 work together to adjust the power of microwave transmitter 90. The computer controller 70 may be a convention controller. In the preferred embodiment, a Programmable Logic Controller (PLC) manufactured by Allen Bradley (model no. 5/04, part no. 1747-L542) is used. The computer controller 70 keeps track of the amount of food product 19 detected by the product sensor system 30. In the preferred embodiment, the computer controller 70 stores the food product information in memory 80 and periodically references the memory 80 to determine the load in the cooking cavities. Memory 80 is a representation of the food products 19 in the cavity.

The following example will describe the operation of the product sensor system 30, the movement sensor system 60, the computer controller 70 and the microwave transmitter 90. In this example, the invention is applied to a conveyor microwave oven having a single microwave cavity. The system is periodic, so at set times, the motor 50 in conjunction with axles 14 and 13 move the conveyor belt 12 and the food products 19 a set distance of 5½ inches (duty cycle). The product sensor system 30 comprises three product sensors 31, 32 and 33.

In the first duty cycle (while the belt 12 is moving 5½ inches), the product sensors 31 detects a piece of bacon but product sensors 32 and 33 do not detect any food products 19. The product sensor system 30 signals the computer controller 70 so that a single bit is set within memory 80 at a location relating to the actual location of the food product 19 on the belt 12. At the next appropriate time, the belt again moves 5½ inches and the movement sensor system 60 signal the computer controller 70. The computer controller 70 causes the previous contents of memory 80 to be shifted one word to the right, making room for the next information from the product sensor system 30. In this duty cycle, sensors 31, 32 and 33 all detect bacon slices and signal the computer controller 70 with this information. Each time the movement sensor system 60 signal the computer controller 70, indicating a new duty cycle, the computer controller 70 causes memory 80 to shift its previous contents one row (word) so to make room for the new data. The "detected" food product data is moving in memory in the same manner that the actual food products 19 are moving on the belt 12. Effectively, the sensors and computer controller work in this fashion to build a representation of the cavity contents in the memory 80. In the duty cycle 3, sensors 31 and 32 detect a food product but sensor 33 does not. Likewise in duty cycle 4, sensors 31, 32 and 33 detect; duty cycle 5, sensor 32 detects, sensors 31 and 33 do not; and duty cycle 6, sensors 31 and 33 detect, sensor 32 does not. An example of the memory 80 is shown below, where ML1–ML6 represent the memory locations and S31, S32 and S33 represent the sensor locations. The detection information of the first duty cycle has been shifted five times and is now in memory location 6.

|     | ML1 | ML2 | ML3 | ML4 | ML5 | ML6 |
| --- | --- | --- | --- | --- | --- | --- |
| S31 | 1 | 0 | 1 | 1 | 1 | 1 |
| S32 | 0 | 1 | 1 | 1 | 1 | 0 |
| S33 | 1 | 1 | 1 | 0 | 1 | 0 |

The ones represent a detection of a food product. Zeros represent no detection. As explained above, the ones and zeros are shifted to the right into the next available memory location with every turn of the movement sensor system 60. In this single cavity example, upon the next duty cycle, the information in memory location six would be discarded. Preferably, the representation of the cavity content in memory is made with a resolution of 5½ inches, the distance the belt 12 travels in one duty cycle. Accordingly, the memory example above represents a microwave cavity that is 33 inches long.

At any particular point, the computer controller 70 can calculate the microwave power necessary for transmitter 90 by the formula: MP=SP×Cf/Cm×K, where MP=microwave power, SP=Setpoint power (maximum power setting of the transmitter based on maximum load), Cf=current fill of the cavity, Cm=maximum fill of the cavity, and K=multiplier to be determined empirically per food product. For example, the memory example above indicates that the microwave cavity is currently only filled with 13 food products, with a maximum potential fill of 18 food products. With a transmitter setpoint power setting of 60 kW and a given K multiplier of 0.9, the MP (microwave power) or new setting is as follows:

$$MP=SP\times Cf/Cm\times K=60\times 13/18\times 0.9=39 \text{ kW}$$

In this manner, the microwave power supplied to the microwave cavity can be adjusted as the load in the cavity changes.

Although the invention can be applied to a single microwave cavity and a single microwave transmitter, a system usually has more than cavity and more than one transmitter. Accordingly, the following example will described the operation of the invention based on a system having four cavities and four transmitters. For purposes of illustration, this system, not including the exit suppression tunnel 18, is 698½ inches long, which translates into 127 segments of 5½ inches each (127 duty cycles). The entrance suppression tunnel 17 is 77 inches long or 14 duty cycles. Each cavity is 143 inches long or 26 duty cycles. There are three 16½ inch long (3 duty cycles) tunnels between the cavities. To allow space for the sensors to be mounted, 130 words of memory will be allocated in the computer controller 70 and memory 80. The product sensor system 30 is mounted 16½ inches (3 duty cycles) in front of the suppression tunnel 17. As described above, bits will be set for the product sensors that detect food products 19. This information will be stored in a memory location, floating point file F21, words 1 through 130. Because it would be time consuming to extract the number of positive bits and add them up for all 130 words, a running total will be kept for the load in each cavity. This will be done in floating point file F22 wherein cavity 1 would be F22:0, cavity 2, F22:1, cavity 3, F22:2, and cavity 4, F22:3. Because, the duty cycle of the conveyor is know at 5½ inches, the location of the microwave cavities can be defined by the duty cycle number or the count related to the signal produced by the movement sensor system 60. For example the first cavity in this system is at movement sensor system signal 17 through 43. Likewise, cavity two is located at signal 46 through 72, cavity three at 75 through 101 and cavity 4 at 104 through 130.

Preferably, the total load in each cavity can be determined by adding the previous total of the cavity to the level of change in that cavity. This level change is based on the amount of product entering and leaving the oven, amount entering minus the amount leaving. Accordingly, the total load in cavity 1 would be determined by the following operation: F22:0=F22:0+(F21:16−F21:43). Likewise, the total load in cavity 2, cavity 3 and cavity 4 would be as follows:

F22:1=F22:1+(F21:45−F21:72);
F22:2=F22:2+(F21:74−F21:101); and
F22:3=F22:3+(F21:103−F21:130).

This current fill of the cavity (F22:0, F22:1, F22:2, and F22:3) is then put into the formula MP=SP×Cf/Cm×K, where Cf is replaced by appropriate memory location cavity total, so that the formula is MP=SP×F:22:X/Cm×K. This formula sets the microwave power level of the each transmitter associated with the cavity. Accordingly, the transmitters for each cavity is adjusted in this manner when the conveyor moves one duty cycle.

As an example of this operation, at a particular point in time, selective memory locations are as follows:

| F22:0 | F22:1 | F22:2 | F22:3 | | | | |
|---|---|---|---|---|---|---|---|
| 73 | 76 | 76 | 68 | | | | |
| F21:16 | F21:43 | F21:45 | F21:72 | F21:74 | F21:101 | F21:103 | F21:130 |
| S31 0 | 1 | 0 | 1 | 1 | 0 | 0 | 1 |
| S32 1 | 1 | 0 | 1 | 1 | 1 | 1 | 1 |
| S33 1 | 1 | 1 | 1 | 1 | 0 | 0 | 1 |

Upon the next duty cycle, the load in cavity 1 (F22:0) would change from 73 to 72 because two food products are entering (F21:16) while three food product are leaving (F21:43) the cavity. Likewise, the load in cavity 2 would change from 76 to 74, cavity 3 from 76 to 78 and cavity 4 from 68 to 66. Based on this data, the computer controller 70 would adjust the power level of each transmitters 90 associated with each cavity using the formulas as described above. For example, the transmitter power for cavity one, having a maximum fill of 78 and assuming its setpoint power is 60 kW and its multiplier is 0.9, would be changed from a power setting of approximately 50.5 kW to approximately 49.8 kW, again using the formula MP=SP×F:22:0/Cm×K.

It is to be understood that the invention is not limited to the exact details of construction, operation, exact materials or embodiments shown and described, as obvious modification and equivalents will be apparent to one skilled in the art. For example, a running total of the percentage the cavity is filled with food products may be stored in memory whereby the setting for the output power of the microwave transmitter is multiplied by this percentage and the preset multiplier to determine the new power output of the cavity. This percentage load would be based on the percentage change of the cavity, i.e., the percentage of load entering the cavity minus the percentage of the load leaving the cavity. As another example, the sensors may be connected to the computer controller through wireless techniques. Accordingly, the invention is therefore to be limited only by the scope of the appended claims.

What is claimed is:

1. An oven apparatus having an cavity capable of receiving items to be heated and a conveyor belt that passes through an input opening and output opening of the cavity, the apparatus comprising:

a conveyor motor operably associated with an axle for moving the conveyor belt;

a generator for providing a level of energy to the cavity;

a movement sensor system to monitor the movement of the conveyor belt;

a product sensor system positioned proximate the input opening of the cavity, wherein the product sensor system establishes lanes where items may be placed, monitors the items within the lanes on the conveyor belt and provides an output; and a controller connected to the movement sensor system, the product sensor system, and the generator, wherein the controller adjusts the level of energy provided to the cavity based on the output from the product sensor system.

2. The apparatus according to claim 1, wherein the product sensor system is mounted at an angle of 5 degrees.

3. The apparatus according to claim 1, wherein the product sensor system is mounted at a height of 1¾ inches above the belt.

4. The apparatus according to claim 1, wherein the movement sensor system provides a signal to the controller on each duty cycle.

5. The apparatus according to claim 4, wherein the duty cycle is 5½ inches.

6. A microwave oven apparatus having an internal cavity capable of receiving food items to be heated and a conveyor belt that passes through an input opening and output opening of the cavity, the apparatus comprising:

a conveyor motor operably associated with an axle for moving the conveyor belt;

a microwave transmitter for providing a level of microwave energy to the cavity;

a movement sensor system positioned to monitor the movement of the conveyor belt;

a product sensor system positioned proximate the input opening of the cavity, wherein the product sensor system establishes lanes where food items may be placed, monitors the food items within the lanes on the conveyor belt and provides an output; and a controller connected to the product sensor system, movement sensor system, and microwave transmitter, wherein the controller adjusts the level of microwave energy provided to the cavity based on the output from the product sensor system.

7. The apparatus according to claim 6, further comprising a memory associated with the controller, configured to record the output of the product sensor system and based on the movement of the conveyor belt monitored by the movement sensor system.

8. The apparatus according to claim 7, wherein the memory records the amount of items within the cavity such that the controller, based on the contents of the memory, adjusts the microwave energy relative to the amount of items to be heated within the cavity.

9. The apparatus according to claim 6, wherein the movement sensor system provides a signal to the controller on each duty cycle.

10. The apparatus according to claim 9, wherein the duty cycle is 5½ inches.

11. The apparatus according to claim 6, further comprising:

at least one additional internal cavity capable of receiving items to be heated and an input opening and output opening through which the conveyor belt passes; and an additional microwave generator for providing a level of microwave energy to the additional cavity, wherein the controller adjusts the level of microwave energy provided to the additional cavity based on the output from the product sensor system.

12. A method for heating food items placed on a conveyor belt that passes through an internal cavity of a microwave oven, the internal cavity having an input opening and an output opening, comprising:

moving the conveyor belt and the food items placed within a plurality of lanes on the belt through the internal cavity;

providing a level of microwave energy to the cavity;

monitoring the movement of the conveyor belt;

monitoring the food items placed within the lanes on the conveyor belt; and adjusting the level of microwave energy provided to the cavity based on whether the food items are present in the lanes on the conveyor belt.

13. The method according to claim 12, further comprising recording, in a memory, the amount of food items placed on the conveyor belt.

14. A microwave oven having an internal cavity capable of receiving food items to be heated, the internal cavity having an input opening, and an output opening, and a microwave transmitter for providing a level of microwave energy to the cavity, the oven comprising:

a conveyor belt, having a width, that passes through the input opening and output opening of the cavity, wherein the conveyor belt is disposed around a plurality of axles;

a conveyor motor operably associated with at least one of the axles so that the motor moves the conveyor belt;

a movement sensor system to detect the movement of the conveyor belt, wherein the movement sensor system provides a movement output when the belt rotates;

a product sensor system positioned proximate the input opening of the cavity and proximate the conveyor belt, wherein the product sensor system comprises a plurality of product sensors that are spaced across the width of the conveyor belt so to establish lanes where food items may be placed and monitored and wherein the product sensors detect whether food items are present in the lanes on the conveyor belt; and a controller connected to the product sensors, movement sensor system and microwave transmitter, wherein the controller adjust the level of the microwave energy provided to the cavity based on whether the product sensors detect the presence of food items in the lanes on the conveyor belt and based on the movement of the axle and conveyor belt.

* * * * *